United States Patent
Steffen (10) Patent No.: US 9,188,069 B2
(45) Date of Patent: Nov. 17, 2015

(54) GASEOUS FUEL SYSTEM, DIRECT INJECTION GAS ENGINE SYSTEM, AND METHOD

(71) Applicant: Caterpillar Inc., Peoria, IL (US)

(72) Inventor: Joshua W. Steffen, El Paso, IL (US)

(73) Assignee: Caterpillar Inc., Peoria, IL (US)

( * ) Notice: Subject to any disclaimer, the term of this patent is extended or adjusted under 35 U.S.C. 154(b) by 378 days.

(21) Appl. No.: 13/727,811

(22) Filed: Dec. 27, 2012

(65) Prior Publication Data
US 2014/0182551 A1    Jul. 3, 2014

(51) Int. Cl.

| | |
|---|---|
| F02M 21/02 | (2006.01) |
| F02D 19/06 | (2006.01) |
| F02D 19/10 | (2006.01) |
| F02M 43/04 | (2006.01) |
| F02M 47/02 | (2006.01) |
| F02M 63/02 | (2006.01) |
| F02M 21/06 | (2006.01) |

(52) U.S. Cl.
CPC ........ *F02D 19/0647* (2013.01); *F02D 19/0684* (2013.01); *F02D 19/0694* (2013.01); *F02D 19/10* (2013.01); *F02M 43/04* (2013.01); *F02M 47/02* (2013.01); *F02M 63/0225* (2013.01); *F02D 19/0623* (2013.01); *F02D 19/0689* (2013.01); *F02M 21/06* (2013.01); *F02M 2200/44* (2013.01); *Y02T 10/36* (2013.01)

(58) Field of Classification Search
CPC ....... F02M 39/02; F02M 45/00; F02M 59/24; F02M 59/243; F02M 59/246; F02M 59/26
USPC .................. 123/304, 575, 506, 446
See application file for complete search history.

(56) References Cited

U.S. PATENT DOCUMENTS 3,959,703 A * 5/1976 Rosen ........................... 388/816
5,188,519 A    2/1993 Spulgis
(Continued)

FOREIGN PATENT DOCUMENTS

| CA | 2523732 A1 | 4/2006 |
|---|---|---|
| EP | 1570163 B1 | 8/2006 |
| WO | 2007/056845 A1 | 5/2007 |

OTHER PUBLICATIONS

U.S. Appl. No. 13/730,118, filed Dec. 28, 2012.
(Continued)

*Primary Examiner* — Hung Q Nguyen
*Assistant Examiner* — Josh Campbell
(74) *Attorney, Agent, or Firm* — Leydig, Voit & Mayer, Ltd.

(57) ABSTRACT

The disclosure describes an engine system having liquid and gaseous fuel systems, each of which injects fuel directly into an engine cylinder. A controller controls pumping of a liquefied natural gas (LNG) in the gaseous fuel system. In a pump cycle, a pumping piston is moved in an intake direction over an intake stroke such that the pumping piston produces a negative pressure that draws LNG from a tank fluidly connected to the pumping element into a pumping chamber of a body of the pumping element. The pumping piston is moved in an opposing power direction over a power stroke such that the pumping piston pumps compressed LNG out of the pumping chamber away from the tank. The pumping piston is moved over the intake stroke with an average intake velocity and over the power stroke with an average power velocity, which is greater than the average intake velocity.

10 Claims, 6 Drawing Sheets

(56) References Cited

U.S. PATENT DOCUMENTS

| | | | |
|---|---|---|---|
| 5,810,570 A | 9/1998 | Nguyen | |
| 6,003,478 A | 12/1999 | Huber | |
| 6,035,837 A | 3/2000 | Cohen et al. | |
| 6,073,592 A | 6/2000 | Brown et al. | |
| 6,203,288 B1* | 3/2001 | Kottke | 417/328 |
| 6,283,720 B1 | 9/2001 | Kottke | |
| 6,530,761 B1 | 3/2003 | Chalk et al. | |
| 6,543,395 B2 | 4/2003 | Green | |
| 6,575,147 B2 | 6/2003 | Wulff et al. | |
| 6,589,027 B2 | 7/2003 | Ursan et al. | |
| 6,663,350 B2 | 12/2003 | Tyree, Jr. | |
| 6,694,242 B2 | 2/2004 | Wong | |
| 6,874,474 B2* | 4/2005 | Fuchs | 123/446 |
| 6,898,940 B2 | 5/2005 | Gram et al. | |
| 6,907,870 B2 | 6/2005 | zur Loye et al. | |
| 6,912,992 B2 | 7/2005 | Ancimer et al. | |
| 6,959,693 B2 | 11/2005 | Oda | |
| 7,144,228 B2 | 12/2006 | Emmer et al. | |
| 7,223,080 B2 | 5/2007 | Duron | |
| 7,284,506 B1 | 10/2007 | Sun et al. | |
| 7,410,348 B2 | 8/2008 | Chalk et al. | |
| 7,509,209 B2 | 3/2009 | Davis et al. | |
| 7,627,416 B2 | 12/2009 | Batenburg et al. | |
| 7,684,925 B2 | 3/2010 | Kuo et al. | |
| 7,913,673 B2 | 3/2011 | Vanderslice et al. | |
| 7,957,888 B2 | 6/2011 | Leone et al. | |
| 2004/0098984 A1* | 5/2004 | Duell et al. | 60/431 |
| 2007/0199539 A1* | 8/2007 | Lennox et al. | 123/304 |
| 2010/0147262 A1 | 6/2010 | Martin et al. | |
| 2013/0233392 A1* | 9/2013 | Aarseth | 137/1 |

OTHER PUBLICATIONS

U.S. Appl. No. 13/474,079, filed May 17, 2012.
U.S. Appl. No. 13/474,109, filed May 17, 2012.

* cited by examiner

GASEOUS FUEL SYSTEM, DIRECT INJECTION GAS ENGINE SYSTEM, AND METHOD

TECHNICAL FIELD

This patent disclosure relates generally to internal combustion engines and, more particularly, to a gaseous fuel system for direct injection gas engines.

BACKGROUND

There are various different types of engines that use more than one fuel. One type is known as a direct injection gas (DIG) engine, in which a gaseous fuel, such as liquefied natural gas (LNG), is injected into the cylinder at high pressure while combustion in the cylinder from a diesel pilot is already underway. DIG engines operate on the gaseous fuel, and the diesel pilot provides ignition of the gaseous fuel. Another type of engine that uses more than one fuel is typically referred to as a dual-fuel engine, which uses a low-pressure gaseous fuel such as natural gas that is mixed at relatively low pressure with intake air admitted into the engine cylinders. Dual-fuel engines are typically configured to operate with liquid fuel such as diesel or gasoline at full power. The gaseous fuel is provided to displace a quantity of liquid fuel during steady state operation. The air/gaseous fuel mixture that is provided to the cylinder under certain operating conditions is compressed and then ignited using a spark, similar to gasoline engines, or using a compression ignition fuel, such as diesel, which is injected into the air/gaseous fuel mixture present in the cylinder.

In dual fuel engines, the gaseous fuel is stored in a pressurized state in a pressure tank, from which it exits in a gaseous state before being provided to the engine. In DIG engines, however, the gaseous fuel is stored in a liquid state at low pressure, such as atmospheric pressure, and at low, cryogenic temperatures in a liquid storage tank. When exiting the liquid storage tank, the liquefied gaseous fuel requires heating to ultimately evaporate and reach a gaseous state before or when it is provided to the engine cylinders.

Pumping liquids typically requires maintaining a net suction pressure above the vapor pressure of the liquid being pumped at a given temperature. This is called the net positive suction head (NPSH) requirement. Whenever the liquid pressure drops below the vapor pressure, liquid boiling occurs, and cavitation and loss of prime of the pump may result. Vapor bubbles may reduce or stop the liquid flow, reduce pump efficiency, lower the mass of the compressed liquid, and possibly damage the system.

Cryogenic liquids, such as liquefied natural gas (LNG), are stored at saturated conditions, and so typically the only available NPSH is the static head caused by the level of the liquid in the storage vessel. This NPSH may be very low, particularly when the storage tank is nearly empty.

U.S. Pat. No. 7,410,348 is entitled, "Multi-Speed Compressor/Pump Apparatus." The '348 patent is directed to a pumping/compressing apparatus that includes a motor and a two-stage device including at least one reciprocating piston, an inlet stage chamber, an outlet stage chamber, an inlet, and an outlet. The piston is arranged to be reciprocated at multiple speeds for either pumping or compressing operations. When the piston is reciprocated at a first speed, the device pumps liquid to the outlet. When the piston is reciprocated at the second speed, which is higher than the first speed, the device compresses gas and provides it to the outlet.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one embodiment, is directed to a direct injection gas (DIG) engine system. The DIG engine system includes an engine, a liquid fuel system, a gaseous fuel system, and a controller. The engine has at least one engine cylinder that forms a variable volume between a reciprocating piston, a bore, and a flame deck. The liquid fuel system includes a liquid fuel injector adapted to inject liquid fuel directly into the variable volume as an ignition source. The gaseous fuel system includes a tank, a pumping element, a drive assembly, and a gaseous fuel injector.

The tank has a storage capacity configured to contain a supply of liquefied natural gas (LNG). The pumping element is in fluid communication with the tank and the gaseous fuel injector. The pumping element includes a body and a pumping piston disposed within the body. The pumping piston and the body define a pumping chamber therebetween. The pumping piston is reciprocally movable over a range of travel in an intake direction and a power direction in opposing relationship thereto. The drive assembly is adapted to reciprocally move the pumping piston in a cycle. The cycle includes moving the pumping piston in the intake direction over an intake stroke such that the pumping piston produces a negative pressure that draws an amount of LNG from the tank into the pumping chamber of the body and moving the pumping piston in the power direction over a power stroke such that the pumping piston compresses the amount of LNG in the pumping chamber to form compressed LNG and pumps the compressed LNG out of the pumping chamber toward the gaseous fuel injector. The gaseous fuel injector is configured to inject LNG into the variable volume as a power source.

The controller is in electrical communication with the drive assembly. The controller is adapted to control the drive assembly such that the pumping piston moves in the intake direction over the intake stroke with an average intake velocity and moves in the power direction over the power stroke with an average power velocity. The average intake velocity is less than the average power velocity.

In another aspect, the disclosure describes in one embodiment a gaseous fuel system for an engine system. The gaseous fuel system includes a tank, a pumping element, a drive assembly, and a controller.

The tank has a storage capacity configured to contain a supply of liquefied natural gas (LNG). The pumping element is in fluid communication with the tank. The pumping element includes a body and a pumping piston disposed within the body. The pumping piston and the body define a pumping chamber therebetween. The pumping piston is reciprocally movable over a range of travel in an intake direction and a power direction in opposing relationship thereto. The drive assembly is adapted to reciprocally move the pumping piston in a cycle. The cycle includes moving the pumping piston in the intake direction over an intake stroke such that the pumping piston produces a negative pressure that draws an amount of LNG from the tank into the pumping chamber of the body and moving the pumping piston in the power direction over a power stroke such that the pumping piston compresses the amount of LNG in the pumping chamber to form compressed LNG and pumps the compressed LNG out of the pumping chamber away from the tank.

The controller is in electrical communication with the drive assembly. The controller is adapted to control the drive assembly such that the pumping piston moves in the intake direction over the intake stroke with an average intake velocity and moves in the power direction over the power stroke with an average power velocity, the average intake velocity being less than the average power velocity.

In yet another aspect, the disclosure describes in one embodiment a method for pumping liquefied natural gas (LNG) in a controlled manner. A pumping piston of a pumping element is reciprocally moved in a cycle. In the cycle, the pumping piston is moved in an intake direction over an intake stroke such that the pumping piston produces a negative pressure that draws an amount of LNG from a tank fluidly connected to the pumping element into a pumping chamber of a body of the pumping element. The pumping piston is moved in a power direction, which is in opposing relationship to the intake direction, over a power stroke such that the pumping piston compresses the amount of LNG in the pumping chamber to form compressed LNG and pumps the compressed LNG out of the pumping chamber away from the tank. The pumping piston is moved over the intake stroke with an average intake velocity. The pumping piston is moved over the power stroke with an average power velocity. The average intake velocity is less than the average power velocity.

Further and alternative aspects and features of the disclosed principles will be appreciated from the following detailed description and the accompanying drawings. As will be appreciated, the gaseous fuel systems, direct injection gas engine systems, and methods disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
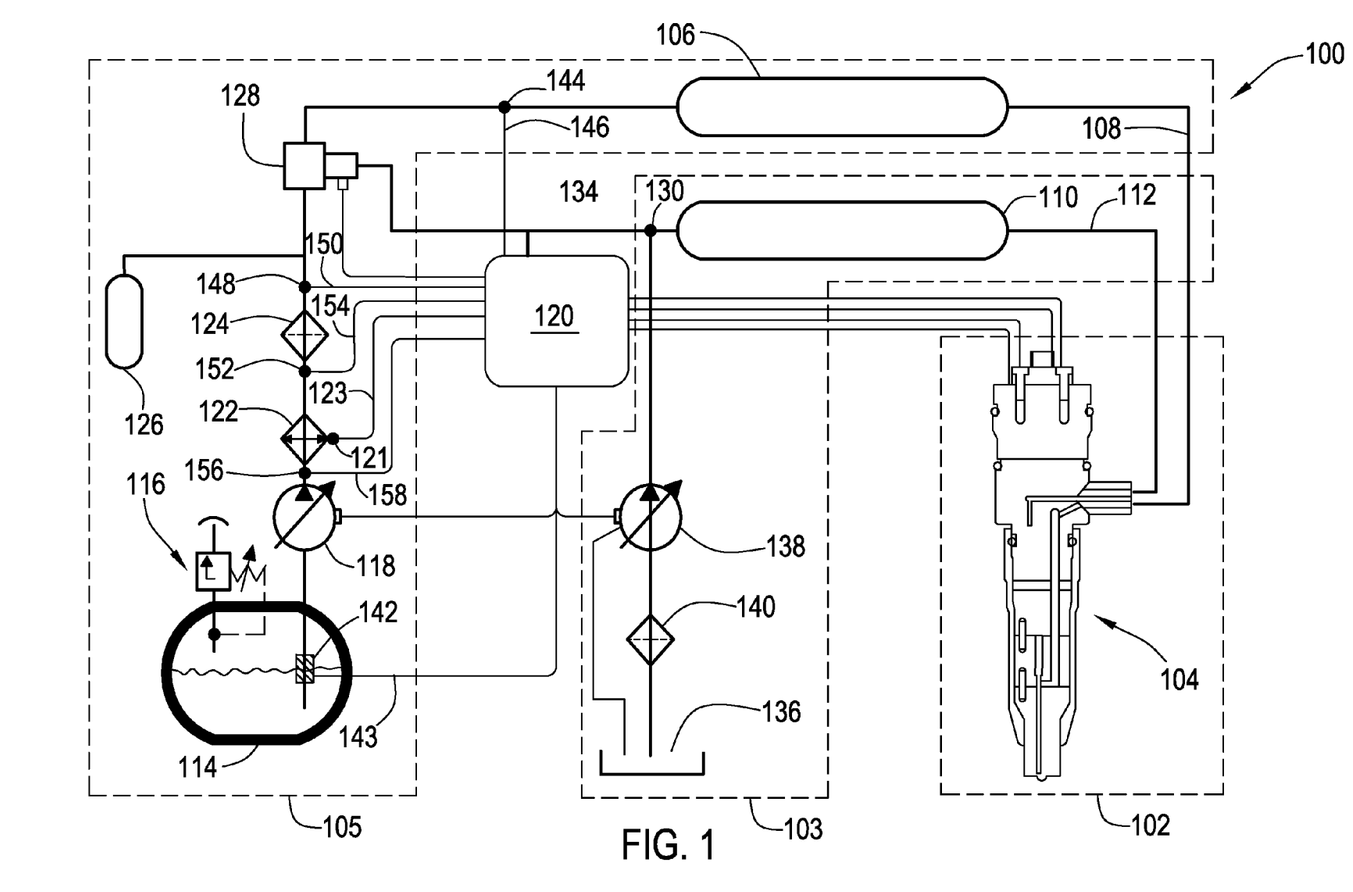
FIG. 1 is a schematic and diagrammatic view of an embodiment of a direct injection gas (DIG) and liquid fuel system for an engine.

Turning now to the Figures, a block diagram of a DIG engine system 100 suitable for use with principles of the present disclosure is shown in FIG. 1. The DIG engine system 100 includes an engine 102, a liquid fuel system 103, a gaseous fuel system 105, and a controller 120.

Figure 2:
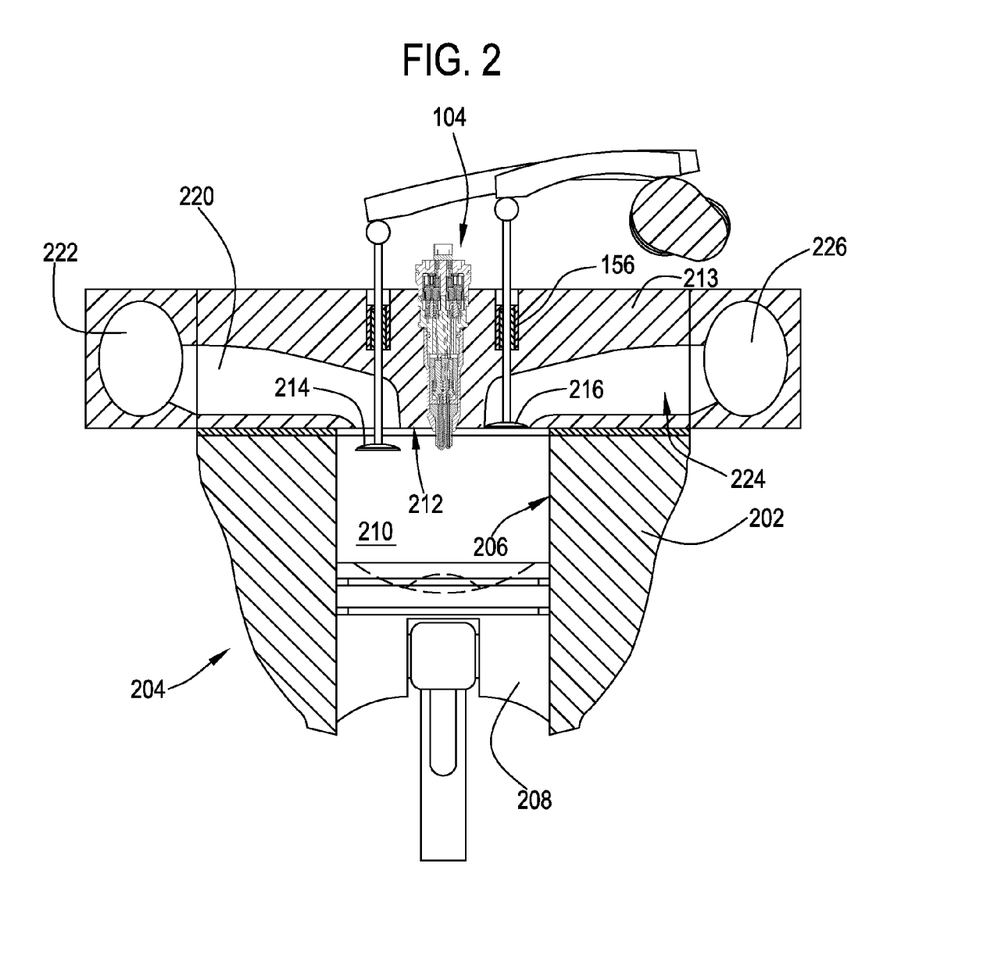
FIG. 2 is a cross-sectional view of an embodiment of a DIG engine cylinder.

The engine 102 can have at least one engine cylinder that forms a variable volume between a reciprocating piston, a bore, and a flame deck (see FIG. 2). The DIG engine system 100 includes an engine 102 (shown diagrammatically in FIG. 1) having a fuel injector 104 associated with each engine cylinder (see FIG. 2). In embodiments, the engine 102 includes a plurality of engine cylinders each having a fuel injector 104 associated therewith. The illustrated fuel injector 104 is a dual-check injector configured to independently inject predetermined amounts of two separate fuels and acts as both a liquid fuel injector and a gaseous fuel injector.

The liquid fuel system 103 includes a liquid fuel injector in the form of the illustrated fuel injector 104 adapted to inject liquid fuel directly into the variable volume as an ignition source. The gaseous fuel system 105 includes a gaseous fuel injector in the form of the illustrated fuel injector 104 adapted to inject gaseous fuel directly into the variable volume as a power source. The controller 120 is adapted to control the functionality of the DIG engine system 100 and to monitor the health and operation of the DIG engine system 100.

The fuel injector 104 is connected to a high-pressure gaseous fuel rail 106 via a gaseous fuel supply line 108 and to a high-pressure liquid fuel rail 110 via a liquid fuel supply line 112. In the illustrated embodiment, the gaseous fuel is natural or petroleum gas that is provided through the gaseous fuel supply line 108 at a pressure of between about 25-50 MPa, and the liquid fuel is diesel, which is maintained within the liquid fuel rail 110 at about 25-50 MPa, but any other pressures or types of fuels may be used depending on the operating conditions of each engine application. It is noted that although reference is made to the fuels present in the gaseous fuel supply line 108 and the liquid fuel rail 110 using the words "gaseous" or "liquid," these designations are not intended to limit the phase in which fuel is present in the respective fuel rail 106, 110 and are rather used solely for the sake of convenient reference. For example, the fuel provided at a controlled pressure within the gaseous fuel supply line 108, depending on the pressure at which it is maintained, may be in a liquid, gaseous or supercritical phase. Additionally, the liquid fuel can be any hydrocarbon based fuel; for example DME (Di-methyl Ether), biofuel, MDO (Marine Diesel Oil), or HFO (Heavy Fuel Oil).

Whether the DIG engine system 100 is installed in a mobile or a stationary application, each of which is contemplated, the gaseous fuel may be stored in a liquid state in a cryogenic tank 114, which can be pressurized at a relatively low pressure, for example, atmospheric, or at a higher pressure. In the illustrated embodiment, the cryogenic tank 114 is insulated to store liquefied natural gas (LNG) at a temperature of about −160° C. (−256° F.) and at a pressure that is between about 100 and 1750 kPa. In other embodiments, other storage conditions may be used. The tank 114 can include a pressure relief valve 116.

During operation, LNG from the tank is compressed, still in a liquid phase, by a pump 118, which raises the pressure of the LNG while maintaining the LNG in a liquid phase. The pump 118 is configured to selectively increase the pressure of the LNG to a pressure that can vary in response to a pressure command signal provided to the pump 118 from the controller 120.

The compressed LNG is heated in a heat exchanger 122. The heat exchanger 122 provides heat to the compressed LNG to reduce density and viscosity while increasing its enthalpy and temperature.

In one exemplary application, the LNG can enter the heat exchanger 122 at a temperature of about −160° C., a density of about 430 kg/m$^3$, an enthalpy of about 70 kJ/kg, and a viscosity of about 169 µPa s as a liquid. The LNG can exit the heat exchanger at a temperature of about 50° C., a density of about 220 kg/m$^3$, an enthalpy of about 760 kJ/kg, and a viscosity of about 28 µPa s. It should be appreciated that the values of such representative state parameters may be different depending on the particular composition of the fuel being used and the particular operating conditions present. In general, the fuel is expected to enter the heat exchanger in a cryogenic, liquid state, and exit the heat exchanger in a supercritical gas state, which is used herein to describe a state in which the fuel is gaseous but has a density that is between that of its vapor and liquid phases.

The heat exchanger 122 may be any known type of heat exchanger or heater for use with LNG. In the illustrated embodiment, the heat exchanger 122 is a jacket water heater that extracts heat from engine coolant. In other embodiments, the heat exchanger 122 may be embodied as an active heater, for example, a fuel fired or electrical heater, or as a heat exchanger using a different heat source, such as heat recovered from exhaust gases of the engine 102, a different engine belonging to the same system such as what is commonly the case in locomotives, waste heat from an industrial process, and other types of heaters or heat exchangers. In the embodiment shown in FIG. 1, which uses engine coolant as the heat source for the heat exchanger 122, a temperature sensor 121 is disposed to measure the temperature of engine coolant exiting the heat exchanger 122 and provide a temperature signal 123 to the controller 120.

Gas exiting the heat exchanger 122 is filtered at a filter 124. A portion of the filtered gas may be stored in a pressurized accumulator 126, and the remaining gas is provided to a pressure control module 128. Pressure-regulated gas is provided to the gaseous fuel supply line 108. The pressure control module 128 is responsive to a control signal from the controller 120 and/or is configured to regulate the pressure of the gas provided to the fuel injector 104. The pressure control module 128 can be a mechanical device such as a dome-loaded regulator or can alternatively be an electro-mechanically controlled device that is responsive to a command signal from the controller 120.

The liquid fuel system 103 includes a liquid fuel pump 138 configured to draw liquid fuel from a liquid fuel reservoir 136 and provide liquid fuel compressed to a rail pressure to the liquid fuel rail 110 that is fluidly connected to the liquid fuel injector in the form of the fuel injector 104. Liquid fuel, which in the illustrated embodiment comprises diesel fuel, is stored in the fuel reservoir 136. From there, fuel is drawn into liquid fuel pump 138, in the form of a variable displacement pump in the illustrated embodiment, through a filter 140 and at a variable rate depending on the operating mode of the engine. The rate of fuel provided by the liquid fuel pump 138 is controlled by the variable displacement capability of the liquid fuel pump 138 in response to a command signal from the controller 120. Pressurized liquid fuel from the liquid fuel pump 138 is provided to the liquid fuel rail 110. A liquid fuel pressure sensor 130 can be provided to measure and provide a diesel pressure signal 134 indicative of the same to the controller 120.

The DIG engine system 100 may include various other sensors providing information to the controller 120 relative to the operating state and overall health of the system. Relative to the gaseous fuel system, a level indicator sensor 142 associated with the tank 114 and disposed to measure a level of LNG present in the tank 114. The level indicator sensor 142 provides a level signal 143 to the controller 120 that is indicative of the level of LNG that remains within the tank 114.

The DIG engine system 100 may include various other sensors that are indicative of the state of the gaseous fuel at various locations in the system. The gas state thus indicated may be based on a direct measurement of a parameter or on a so-called "virtual" measurement of a parameter, which relative to this disclosure means a determination of a parameter that is inferred based on another directly measured parameter having a known or estimated relationship with the virtually measured parameter. As used herein, gas state is meant to describe a parameter indicative of the thermodynamic state of the gaseous fuel, for example, the pressure and/or temperature of the fuel, as appropriate. When determining the state of the gas, the parameter of interest for purpose of diagnosing the health of the system depends on changes that may occur to the state of the gas. Accordingly, while pressure of the gas may be relevant to diagnosing the operation of a pump, the temperature of the gas may be more relevant to diagnose the operating state of a heat exchanger that heats the gas. In the description that follows, reference is made to "state" sensors, which should be understood to be any type of sensor that measures one or more state parameters of the gas, including but not limited to pressure, temperature, density and the like.

Accordingly, a gas state sensor 144 is disposed to measure and provide a rail state signal 146 indicative of a fluid state at the gaseous fuel supply line 108. The rail state signal 146 may be indicative of pressure and/or temperature of the gas. A state sensor 148 is disposed to measure and provide a filter state signal 150 indicative of the gas state between (downstream of) the filter 124 and (upstream of) the pressure control module 128. The filter state signal 150 may be indicative of gas pressure. An additional state sensor 152 is disposed to measure and provide a heater state signal 154 indicative of the gas state between the heat exchanger 122 and the filter 124. The heater state signal 154 may be indicative of gas temperature at that location. An additional state sensor 156 is disposed to measure and provide a liquid state signal 158 at the outlet of the pump 118. The liquid state signal 158 at the outlet of the pump 118 may be indicative of gas pressure, for purpose of diagnosing pump operation, and/or gas temperature, for purpose of comparing to the heater state signal 154 downstream of the heat exchanger 122 for diagnosing the operating state of the heat exchanger 122. The rail state signal 146, filter state signal 150, heater state signal 154, liquid state signal 158, and/or other state signals indicative of the fluid state for the liquid/gaseous fuel are provided to the controller 120 continuously during operation.

The controller 120 includes functionality and other algorithms operating to monitor the various signals provided by system sensors and detect various failure or abnormal operating modes of the DIG engine system 100 such that mitigating actions can be taken when an abnormal operating condition is present. In other words, the controller 120 includes a failure mitigation system for the DIG engine system 100 that can detect and address fuel system failures or abnormal operating modes in the fuel system, especially abnormal operating modes in the gaseous fuel system. Examples of abnormal operating modes of the system may include depletion of the LNG in the tank 114, malfunction of the pump 118 or its controller, clogging of any of the filters, freezing and/or clogging of the heat exchanger 122, malfunction of the pressure control module 128, and/or other malfunctions that specifically relate to the supply of the compressed gas to and from the gaseous fuel supply line 108.

During normal operation, gaseous and liquid fuel can be independently injected at high pressure into engine cylinders through the fuel injector 104. When an abnormal operating condition is present that diminishes the ability of the DIG engine system 100 (FIG. 1) to provide a sufficient amount of gaseous fuel to operate the engine, the controller 120 can be adapted to activate a limp-home mode. During the limp-home operating mode, various engine parameters are adjusted to enable engine operation on the liquid fuel under conditions that provide sufficient power to move the vehicle, into which the engine is installed, to a service location. In one embodiment, for example, the engine power while operating in limp-home mode is about 50% of total engine power such that even a fully-laden vehicle travelling up an incline will be able to maintain sufficient power to dump the load and move the vehicle to a safe location.

Figure 3:
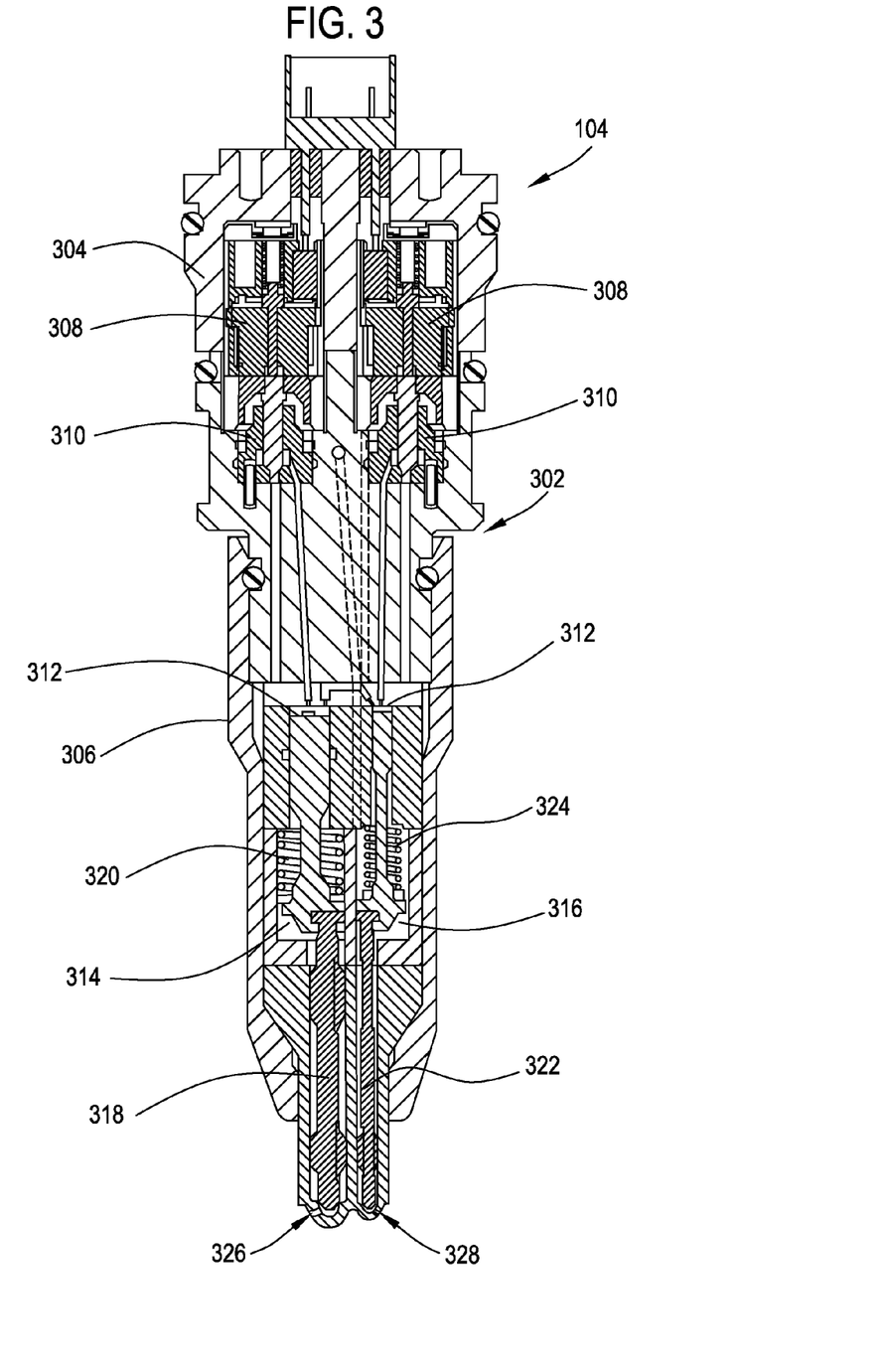
FIG. 3 is a cross-sectional view of an embodiment of a DIG and direct injection liquid fuel injector.

A cross section of one embodiment for the injector 104 is shown installed in an engine cylinder 204 in FIG. 2 and removed from the engine in FIG. 3. Although the injector 104 shown in these Figures has two checks arranged side by side, any other fuel injector design is suitable, for example, dual injectors having concentric checks or needle valves. In reference now to the Figures, each engine cylinder 204 includes a bore 206, which is formed within a cylinder block 202 and slidably accepts therewithin a piston 208. As is known from typical engine applications, pistons can be connected to an engine crankshaft (not shown), which operates to provide a force tending to move each piston within the cylinder bore, for example, during a compression stroke, as well as can be moved by a force applied by the piston to rotate the crankshaft, for example, during a combustion or power stroke.

The cylinder 204 defines a variable volume 210 that, in the illustrated orientation, is laterally bound by the walls of the bore 206 and is closed at its ends by a top portion or crown of the piston 208 and by a surface 212 of the cylinder head 213, which is typically referred to as the flame deck. The variable volume 210 changes between maximum and minimum capacity as the piston 208 reciprocates within the bore 206 between bottom dead center (BDC) and top dead center (TDC) positions, respectively.

In reference to FIG. 2, each cylinder 204 includes at least one intake valve 214 and at least one exhaust valve 216. It is noted that, although the cylinder 204 is illustrated in a fashion consistent with an engine operating under at least a four-stroke cycle, and thus includes cylinder intake and exhaust valves, other types of engines such as two-stroke engines are contemplated but are not specifically illustrated for brevity. In the particular engine illustrated in FIG. 2, the intake and exhaust valves 214, 216 are selectively activated to fluidly connect the variable volume 210 with sinks and sources of fluids during operation of the engine 102. Specifically, the intake valve 214 selectively blocks an intake passage 220 that fluidly interconnects the variable volume 210 with an intake manifold 222. Similarly, the exhaust valve 216 selectively blocks an exhaust passage 224 that fluidly interconnects the variable volume 210 with an exhaust manifold 226. In the illustrated embodiment, the fuel injector 104 is disposed to selectively inject diesel and compressed natural gas (CNG) fuel directly into the variable volume 210 of each engine cylinder 204.

A cross section of the injector 104 is shown in greater detail in FIG. 3. It is noted that although a single injector that is configured to independently inject two fuels is shown herein, it is contemplated that two injectors, one corresponding to each of the two fuels, may be used instead of the single injector. Alternatively, a fuel injector having concentric needles can be used. Thus, the injector 104 represents one of numerous possible embodiments of injectors configured to independently inject two types of fuel. The specific embodiment of the injector 104 uses diesel fuel pressure to activate the check valve for injecting gaseous fuel, even though both fuels may be provided to the injector at about the same pressure, which in the illustrated embodiment is between 25 and 50 MPa.

In particular reference to the cross section shown in FIG. 3, the injector 104 includes an injector body 302 that comprises an actuator housing 304 and a needle housing 306. The actuator housing 304 forms an internal cavity that houses two electronic actuators 308. Each actuator 308 activates a respective two-way valve 310, which selectively pressurizes or releases fluid pressure in a respective hydraulic closing chamber 312. The injector 104 further includes two fuel inlets, each fluidly connected to a respective injection chamber. More specifically, diesel fuel from the liquid fuel rail 110 (FIG. 1) is provided to a diesel injection chamber 314, while gaseous fuel from the gaseous fuel supply line 108 (FIG. 1) is provided to a gaseous fuel injection chamber 316. A diesel fuel needle 318 is biased by a diesel closing spring 320 and by fluid pressure at the respective hydraulic closing chamber 312 towards a closed position in which fluid present in the diesel injection chamber 314 is not permitted to exit the injector 104 and enter the variable volume 210 (FIG. 2). Similarly, a gaseous fuel needle 322 is biased by gaseous fuel closing spring 324 and by a hydraulic force that results by fluid pressure present in the respective hydraulic closing chamber 312 towards a closed position.

When diesel or gas is injected from the injector 104, fuel is injected via at least one dedicated diesel nozzle opening 326 and at least one dedicated gaseous fuel nozzle opening 328, respectively, which are opened when the respective needle 318, 322 is lifted. More specifically, when injecting diesel, a signal is provided from the controller 120 (FIG. 1) to the respective actuator 308, which activates and causes the corresponding two-way valve 310 to change position and release fluid pressure in the corresponding hydraulic closing chamber 312. When this pressure is relieved, a hydraulic pressure acting on the diesel fuel needle 318 overcomes the force of the diesel closing spring 320 and permits the diesel fuel needle 318 to lift and permit diesel to be injected into the variable volume 210 (FIG. 1) through each diesel nozzle opening 326. Similarly, a separate command signal from the controller 120 is provided to the actuator 308 corresponding to the gaseous fuel side of the injector 104. Activation of this actuator 308 causes the corresponding two-way valve 310 (on the right side of the illustration of FIG. 3) to change position and release hydraulic pressure in the hydraulic closing chamber 312 corresponding to the gaseous fuel injection chamber 316. When this pressure is relieved, a hydraulic/pneumatic pressure acting on the gaseous fuel needle 322 overcomes the force of the gaseous fuel closing spring 324 and permits the gaseous fuel needle 322 to lift and permit gas to be injected at a high pressure directly into the variable volume 210 (FIG. 1) through each dedicated gaseous nozzle openings 328 of the injector 104.

In this way, the injector 104 is configured to selectively inject diesel or gas during engine operation. In the illustrated embodiment, the total fuel energy supply of the engine during normal operation is made up by an energy contribution of about 3-10% by the diesel fuel and the remaining 90-97% of the total fuel energy supply by the gaseous fuel. The specific displacement ratio of gas with diesel may vary depending on the particular operating point of the engine. These fuels are injected at different times during engine operation. For example, diesel may be injected first while the piston 208 is moving towards the TDC position as the cylinder 204 is undergoing or is close to completing a compression stroke. When combustion of the diesel fuel in the variable volume is initiated or is about to initiate, the injector 104 causes the diesel fuel needle 318 to open such that gas at a high pressure is injected directly into the cylinder 204 and combust as it is ignited by the combusting diesel fuel.

Figures 4, 4A, 4B:
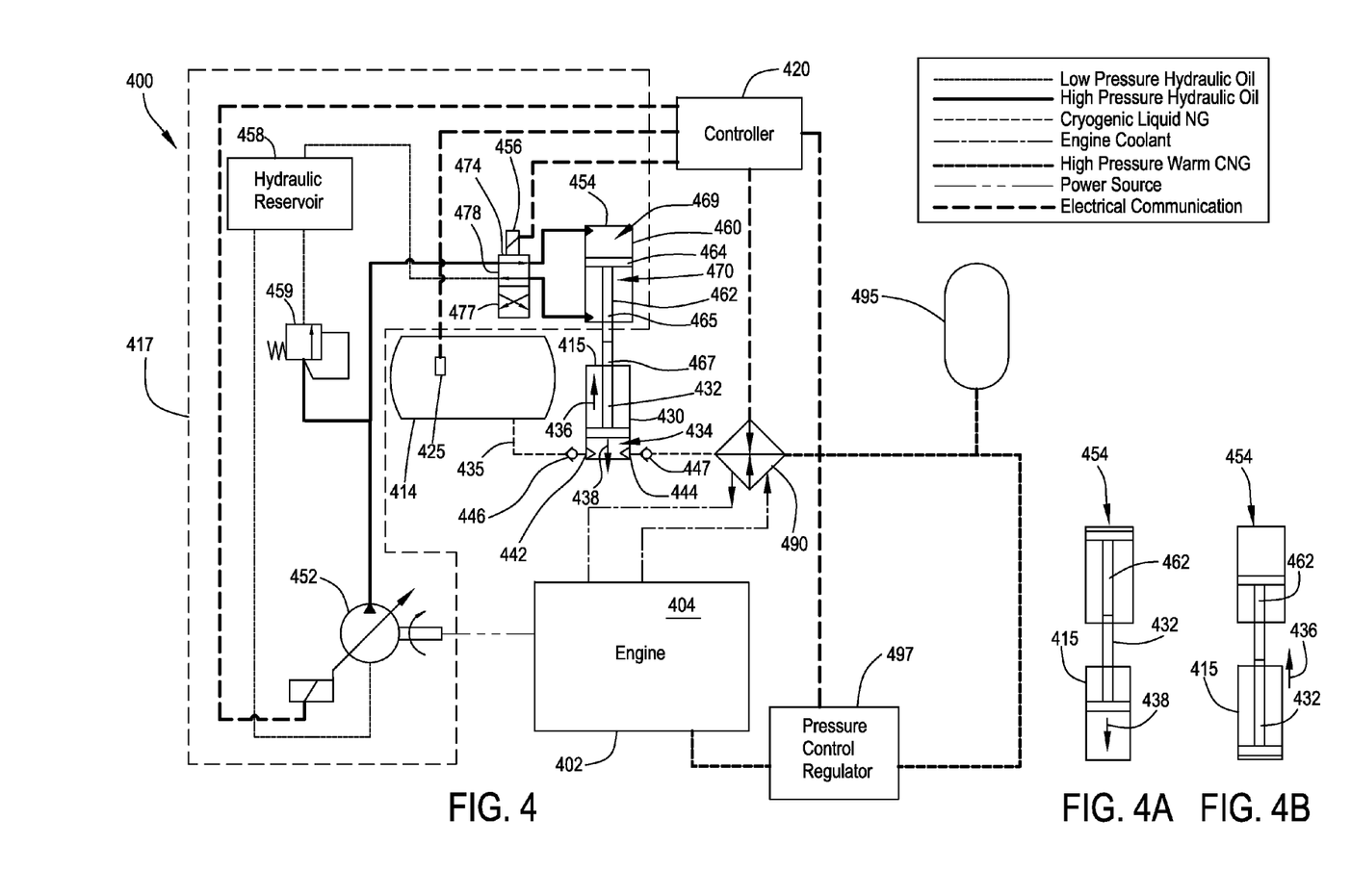
FIG. 4 is a schematic and diagrammatic view of an embodiment of a gaseous fuel system constructed in accordance with principles of the present disclosure.
FIG. 4a is a diagrammatic view of an embodiment of a pumping element of the gaseous fuel system of FIG. 4, illustrating the pumping element at an exemplary endpoint of an intake stroke.
FIG. 4b is a diagrammatic view as in FIG. 4a, but illustrating the pumping element at an exemplary endpoint of a power stroke.

Referring to FIG. 4, an embodiment of a gaseous fuel system 400 constructed in accordance with principles of the present disclosure is shown. The gaseous fuel system 400 of FIG. 4 can be used in a DIG engine system, such as the DIG engine system 100 of FIG. 1. The gaseous fuel system 400 includes a tank 414, a pumping element 415, a drive assembly 417, a gaseous fuel injector 404, and a controller 420.

The tank 414 has a storage capacity configured to contain a supply of liquefied natural gas (LNG). In the illustrated embodiment, the tank 414 comprises a cryogenic tank configured such that it is insulated to store LNG at a temperature of about −160° C. (−256° F.) and at a pressure that is between about 100 and 1750 kPa. In other embodiments, other storage conditions, including storing LNG at atmospheric pressure, can be used. In embodiments, the tank 414 can include a pressure relief valve.

A sensor 425 is disposed in the tank. The sensor 425 is in electrical communication with the controller 420. The sensor 425 is adapted to detect an amount of LNG in the tank 414 and to provide a level signal indicative of the amount of LNG in the tank 414 to the controller 420. The illustrated sensor 425 comprises a fluid level sensor. In other embodiments, other suitable sensors (e.g., a weight sensor) adapted to measure a parameter suitable for use in determining the amount of LNG in the tank 414 can be used.

The pumping element 415 is in fluid communication with the tank 414 and the gaseous fuel injector 404. The pumping element 415 includes a body 430 and a pumping piston 432 disposed within the body 430, the pumping piston 432 and the body 430 defining a pumping chamber 434 therebetween. In embodiments, the pumping element 415 can be disposed within the tank 414 such that it is submersed within the supply of LNG in the tank 414 or in fluid communication with the tank 414 via an LNG supply line 435 as shown in FIG. 4.

The pumping piston 432 is reciprocally movable over a range of travel in an intake direction 436 and a power direction 438 in opposing relationship thereto. The pumping chamber 434 has an increasing volume when the pumping piston 432 moves in the intake direction 436. The pumping chamber 434 has a decreasing volume when the pumping piston 432 moves in the power direction 438.

The body 430 of the pumping element 415 includes an inlet 442 in fluid communication with the tank 414 and an outlet 444 in fluid communication with the gaseous fuel injector 404. A check valve 446 can be provided at the inlet 442 of the body 430 that is configured to prevent fluid from flowing from the inlet 442 to the tank 414 but to allow fluid to flow from the tank 414 to the inlet 442. A check valve 447 can be provided at the outlet 444 of the body 430 that is configured to prevent fluid from flowing from gaseous fuel injector 404 to the outlet 444 but to allow fluid to flow from the outlet 444 to the gaseous fuel injector 404.

The drive assembly 417 is adapted to reciprocally move the pumping piston 432 in a cycle. The cycle includes an intake stroke and a power stroke. FIGS. 4a and 4b show the pumping piston 432 at an exemplary endpoint of an intake stroke and a power stroke, respectively. In the intake stroke, the pumping piston 432 moves from the endpoint of the power stroke in the intake direction 436 over the intake stroke such that the pumping piston 432 produces a negative pressure that draws LNG from the tank 414 into the pumping chamber 434 of the body 430. In the power stroke, the pumping piston 432 moves from the endpoint of the intake stroke in the power direction 438 over the power stroke such that the pumping piston pumps compressed LNG out of the pumping chamber 434 toward the gaseous fuel injector 404.

The illustrated drive assembly 417 includes an electro-hydraulic circuit having a hydraulic pump 452, a hydraulic actuator 454, a directional control valve 456, a hydraulic reservoir 458, and the controller 420. The hydraulic pump 452 is in electrical communication with the controller 420. The hydraulic pump 452 can be adapted to provide a source of pressurized hydraulic fluid with a variable flow. A pressure relief valve 459 can be interposed between the hydraulic pump 452 and the directional control valve 456 to divert the source of pressurized hydraulic fluid to the hydraulic reservoir in the event that the pressure exceeds a predetermined threshold.

The illustrated hydraulic pump 452 comprises a variable displacement pump. The engine 402 is used to drive the hydraulic pump 452 using conventional techniques.

In other embodiments, other suitable arrangements can be used to provide a source of pressurized hydraulic fluid with a variable flow rate. For example, in embodiments, a fixed displacement pump and a variable flow control valve can be used to provide a source of pressurized hydraulic fluid with a variable flow rate to selectively drive the pumping piston 432 at different rates during the intake stroke and the power stroke. In other embodiments, the hydraulic pump 452 can be driven using other power sources, such as a power-take off or a pump stack, for example.

The hydraulic actuator 454 is in selective fluid communication with the source of pressurized hydraulic fluid provided by the hydraulic pump 452 through the directional control valve 456. The hydraulic actuator 454 can be operably arranged with the pumping piston 432 of the pumping element 415 to selectively reciprocally move the pumping piston 432.

The illustrated hydraulic actuator 454 includes a cylinder 460 and a hydraulic piston 462 reciprocally movable within the cylinder 460 over a range of travel between a retracted position and an extended position (see FIGS. 4a and 4b, respectively). The hydraulic piston 462 includes a piston head 464 and a rod 465 extending from the cylinder 460. The rod 465 of the hydraulic actuator 454 can be operably arranged with the pumping piston 432 of the pumping element 415 such that moving the hydraulic piston 462 of the hydraulic actuator 454 moves the pumping piston 432 of the pumping element. In the illustrated embodiment, the rod 465 of the hydraulic actuator 454 is operably coupled with a rod 467 of the pumping piston 432. The cylinder 460 and the piston head 464 of the hydraulic piston 462 define a piston-side chamber 469 and a rod-side chamber 470 each having a variable volume.

The directional control valve 456 is in electrical communication with the controller 420. The directional control valve 456 is in fluid communication with the source of pressurized hydraulic fluid provided by the hydraulic pump 452 and in selective fluid communication with the hydraulic actuator 454. The directional control valve 456 can include a valve element 474 movable over a range of travel between an intake flow position 477 and a power flow position 478 (as shown in FIG. 4). In the intake flow position 477, pressurized hydraulic fluid flows from the hydraulic pump 452 to the hydraulic actuator 454 such that the hydraulic actuator 454 moves the pumping piston 432 of the pumping element 415 in the intake direction 436 to move over the intake stroke. In the power flow position 478 pressurized hydraulic fluid flows from the hydraulic pump 452 to the hydraulic actuator 454 such that the hydraulic actuator 454 moves the pumping piston 432 of the pumping element 415 in the power direction 438 to move over the power stroke. In other embodiments, the directional control valve 456 can include additional flow positions, such as a neutral position in which the source of pressurized hydraulic fluid is substantially prevent from flowing to the hydraulic actuator 454.

In the illustrated embodiment, the directional control valve 456 meters the source of pressurized hydraulic fluid to the piston-side chamber 469 when the valve element 474 is in the power flow position 478 to move the pumping piston 432 of the pumping element 415 in the power direction 438 over the power stroke. Hydraulic fluid in the rod-side chamber 470 can flow back through the directional control valve 456 to the hydraulic reservoir 458 for re-circulation by the hydraulic pump 452. The directional control valve 456 meters the source of pressurized hydraulic fluid to the rod-side chamber 470 when the valve element 474 is in the intake flow position 477 to move the pumping piston 432 of the pumping element 415 in the intake direction 436 over the intake stroke. Hydraulic fluid in the piston-side chamber 469 can flow back through the directional control valve 456 to the hydraulic reservoir 458 for re-circulation by the hydraulic pump 452.

The controller 420 is in electrical communication with the drive assembly 417. The controller 420 is adapted to control the drive assembly 417 such that the pumping piston 432 moves in the power direction 438 over the power stroke with an average power velocity and moves in the intake direction 436 over the intake stroke with an average intake velocity, which is less than the average power velocity.

The illustrated controller 420 is in electrical communication with the directional control valve 456 and is adapted to selectively move the valve element 474 between the intake flow position 477 and the power flow position 478. The controller 420 is in electrical communication with the hydraulic pump 452 and is adapted to control the hydraulic pump 452 to vary the average flow rate of the source of pressurized hydraulic fluid to move the pumping piston 432 at different velocities. The source of pressurized hydraulic fluid can have an average intake flow rate that is proportional to the average intake velocity of the pumping piston during the intake stroke. The source of pressurized hydraulic fluid can have an average power flow rate that is proportional to the average power velocity of the pumping piston during the power stroke.

During the intake stroke, the controller 420 is adapted to control the hydraulic pump 452 such that pressurized hydraulic fluid flows with an average intake flow rate that is proportional to the average intake velocity of the pumping piston during the intake stroke when the valve element 474 is in the intake flow position. During the power stroke, the controller 420 is adapted to control the hydraulic pump 452 (e.g., increase its speed relative to the intake stroke) such that pressurized hydraulic fluid flows with an average power flow rate that is proportional to the average power velocity of the pumping piston during the power stroke when the valve element is in the power flow position. The average intake flow rate is less than the average power flow rate.

In embodiments, the controller 420 is adapted to control the drive assembly 417 such that the average intake velocity of the pumping piston 432 during the intake stroke produces an average negative pressure that is less than a calculated Net Positive Suction Head (NPSH) requirement. In some embodiments, the calculated NPSH requirement can be based upon a predetermined reserve amount of LNG in the tank 414. For example, the NPSH requirement can be determined for the situation where the predetermined reserve amount of LNG is less than one-fifth of the storage capacity of the tank.

As an example, the reserve amount can be selected to be ten percent of the maximum storage capacity of the tank 414. The NPSH requirement can be calculated for the situation where LNG fills only ten percent of the storage capacity of the tank 414. The controller 420 can be adapted to control the drive assembly 417 such that the average intake velocity of the pumping piston 432 during the intake stroke produces an average negative pressure that is less than the calculated NPSH requirement for the situation where the tank 414 is filled with LNG at a reserve amount comprising only ten percent of the storage capacity of the tank. The tank 414, however, can be filled with an amount of LNG that exceeds the ten-percent reserve amount. The average power velocity can be adjusted to provide the desired average output of compressed LNG from the pumping element 415 for a given cycle.

The sensor 425 can provide a level signal indicative of the amount of LNG in the tank 414 to the controller 420. The controller can be adapted to signal an operator when the amount of LNG in the tank approaches the reserve amount and to instruct the operator to add LNG to the tank 414 when the amount of LNG in the tank 414 is at or below the reserve amount.

In other embodiments, the controller 420 can be adapted to variably control the drive assembly 417 such that the average intake velocity of the pumping piston 432 produces an average negative pressure that is less than a NPSH requirement calculated based upon the amount of LNG in the tank 414 detected by the sensor 425. The controller 420 can be equipped with logic functionality and/or a memory with a database mapping varying amounts of LNG in the tank 414 against corresponding calculated NPSH requirements. For example, the controller 420 can adjust the average intake flow rate of the source of pressurized fluid provided by the hydraulic pump 452 during the intake stroke based upon the calculated NPSH requirement determined by the controller 420 based upon the level signal received from the sensor 425. The average power flow rate can be adjusted to provide the desired average output of compressed LNG from the pumping element 415.

The gaseous fuel system 400 further includes a heater 490 interposed between, and in fluid communication with, the pumping element 415 and the gaseous fuel injector 404. In embodiments, the heater 490 is adapted to receive compressed LNG at a given temperature from the pumping element 415 and to increase the temperature of the compressed LNG to bring the compressed LNG to a supercritical gaseous state. The illustrated heater 490 is a heat exchange that uses engine coolant as the heat source. An accumulator 495 can be provided between the heater 490 and the gaseous fuel injector 404. In embodiments, a filter can be interposed between the heater 490 and the accumulator 495.

The gaseous fuel system 400 can further include a pressure control module 497 interposed between, and in fluid communication with, the heater 490 and the gaseous fuel injector 404. The pressure control module 497 can be adapted to control a pressure of compressed LNG delivered to the gaseous fuel injector 404 from the pumping element 415.

The gaseous fuel injector is configured to inject LNG into the variable volume as a power source. Any suitable gaseous fuel injector can be used, such as those discussed herein.

The gaseous fuel system 400 can be used in embodiments of a DIG engine system, such as the DIG engine system 100 of FIG. 1. The gaseous fuel system 400 can be similar in other respects to the gaseous fuel system of FIG. 1.

Industrial Applicability

Embodiments of a gaseous fuel system, a DIG engine system using a gaseous fuel system and a method for pumping liquefied natural gas (LNG) in a controlled manner are described herein. The industrial applicability of embodiments constructed according to principles of the present disclosure will be readily appreciated from the foregoing discussion. The described principles are applicable for use in multiple embodiments of an engine system and have applicability in many machines which include an engine system.

In embodiments, principles of the present disclosure are applicable to DIG engines having a gaseous fuel system operating with a liquid fuel system, which is used to provide liquid fuel that ignites the gaseous fuel. In the illustrated embodiment, both fuels are injected directly into each engine cylinder using a dual-check fuel injector. The pumping of the gaseous fuel can be carried out in a controlled manner to help reduce the incidence of cavitation and to promote pump efficiency.

Figure 5:
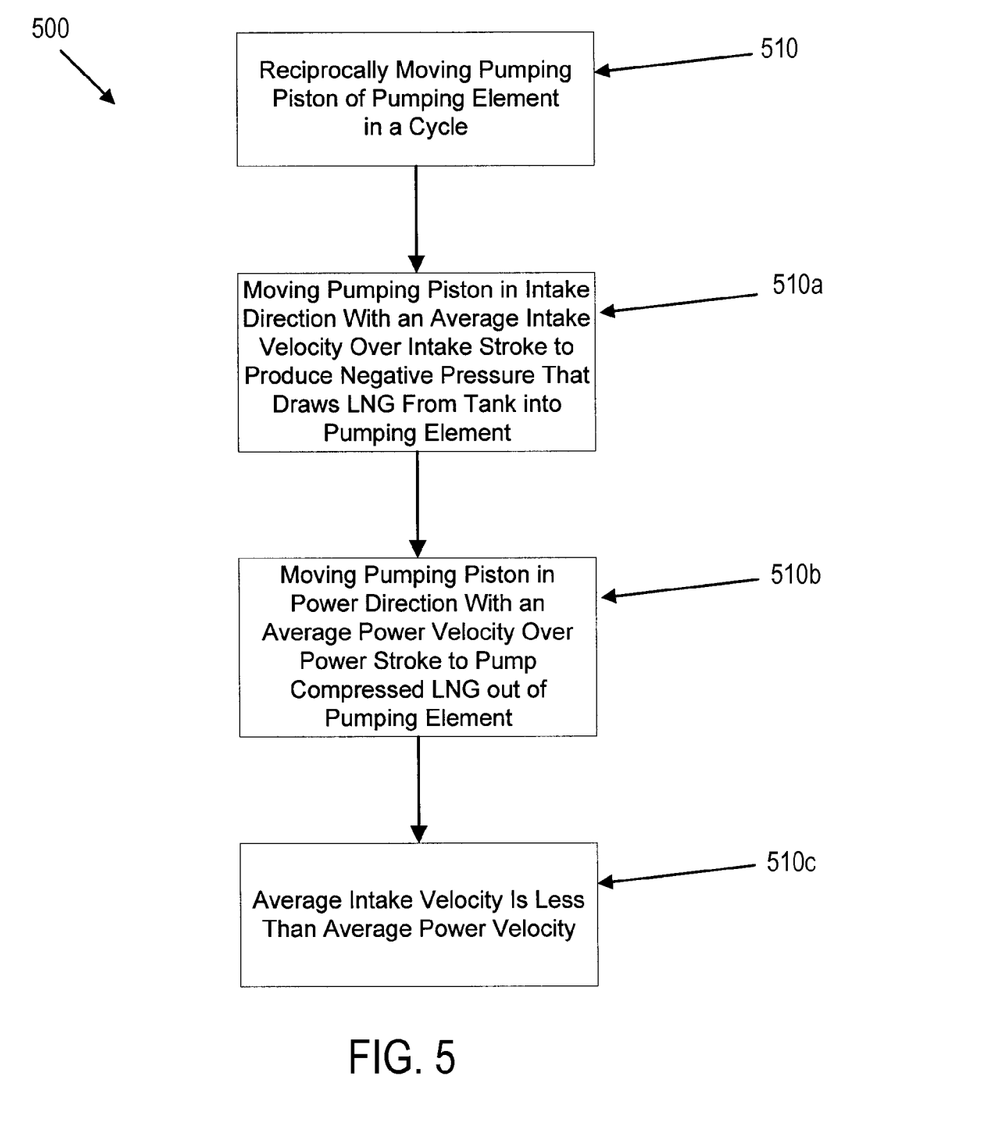
FIG. 5 is a flow chart illustrating steps of an embodiment of a method for pumping liquefied natural gas (LNG) in a controlled manner according to principles of the present disclosure.

For example, referring to FIG. 5, steps of an embodiment of a method 500 for pumping liquefied natural gas (LNG) in a controlled manner following principles of the present disclosure are shown in flowchart form. A pumping piston of a pumping element is reciprocally moved in a cycle (step 510). In the cycle, the pumping piston is moved in an intake direction with an average intake velocity over an intake stroke such that the pumping piston produces a negative pressure that draws LNG from a tank fluidly connected to the pumping element into a pumping chamber of a body of the pumping element (step 510a). The pumping piston is moved in a power direction, which is in opposing relationship to the intake direction, with an average power velocity over a power stroke such that the pumping piston pumps compressed LNG out of the pumping chamber away from the tank (step 510b). The average intake velocity is less than the average power velocity (step 510c).

In embodiments, the average intake velocity of the pumping piston produces an average negative pressure that is less than a calculated Net Positive Suction Head (NPSH) requirement. In embodiments, a step of reciprocally moving the pumping piston includes using a source of pressurized hydraulic fluid to selectively move the pumping piston. The source of pressurized hydraulic fluid can have an average intake flow rate that is proportional to the average intake velocity of the pumping piston during the intake stroke. The source of pressurized hydraulic fluid can have an average power flow rate that is proportional to the average power velocity of the pumping piston during the power stroke.

Figure 6:
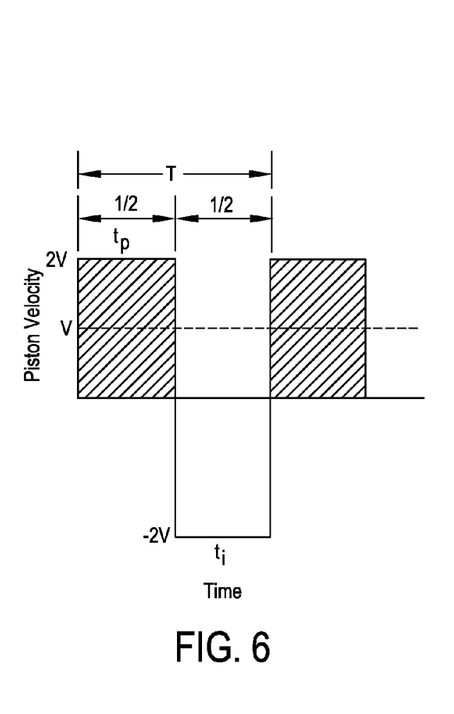
FIG. 6 is a graph of a first exemplary pumping piston cycle, the graph showing piston velocity over time.
Figure 7:
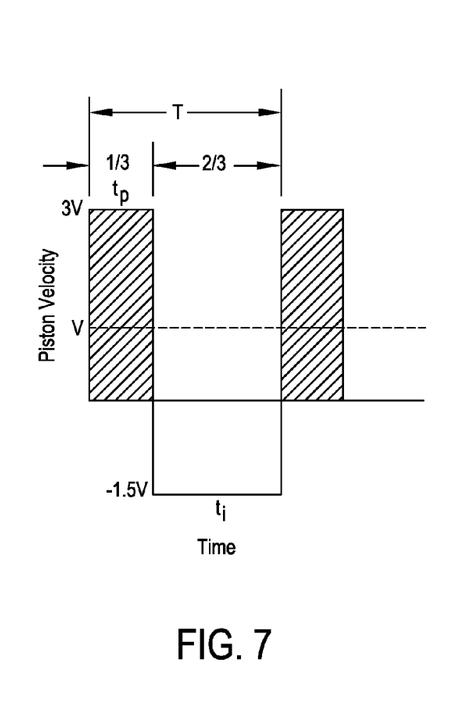
FIG. 7 is a graph of a second exemplary pumping piston cycle following principles of the present disclosure, the graph showing piston velocity over time.
Figure 8:
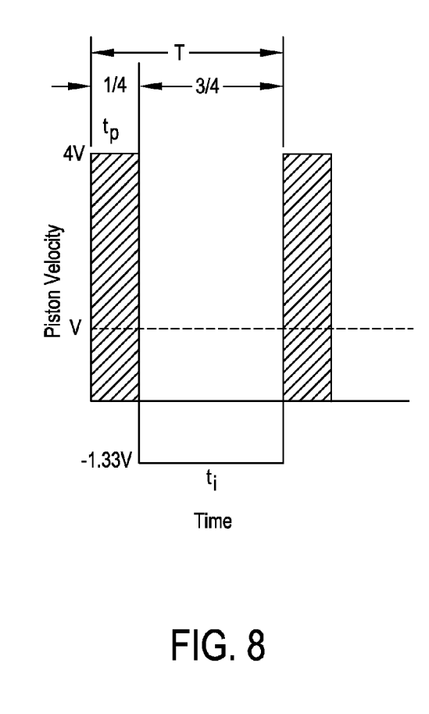
FIG. 8 is a graph of a third exemplary pumping piston cycle following principles of the present disclosure, the graph showing piston velocity over time.

Referring to FIGS. 6-8, exemplary pumping piston cycles are shown which illustrate using principles of the present disclosure to achieve the same pumping element output as a pumping element using equal power sand intake strokes in a cycle. In FIG. 6, the pumping piston undergoes a cycle with a power stroke and an intake stroke with a piston velocity and stroke time that are equal to produce an average cycle flow rate or velocity V. In other words, the pumping piston has an average velocity of 2V during the power stroke which has a time value $t_p$ which is equal to half of the cycle time T (i.e., ½ T). The pumping piston has an average velocity of −2V during the intake stroke which has a time value $t_i$ that is equal to half of the cycle time T (i.e., ½ T).

Referring to FIG. 7, a pumping piston of a pumping element can be configured to follow principles of the present disclosure to reduce the average intake velocity of the pumping piston during an intake stroke relative to the average intake velocity of the pumping piston in FIG. 6, yet achieve a similar pumping output. In FIG. 7, the pumping piston has an average velocity of 3V during the power stroke which has a time value $t_p$ that is equal to one-third of the cycle time T (i.e., ⅓ T). The pumping piston has an average velocity of −1.5V during the intake stroke which has a time value $t_i$ that is equal to two-thirds of the cycle time T (i.e., ⅔ T). The pumping piston undergoes a cycle with an intake stroke having a lesser average velocity than in the case of FIG. 6, yet still produces an average cycle flow rate or velocity V. The reduced average velocity during the intake stroke can help reduce the incidence of cavitation in the pumping element and help maintain the average negative pressure produced by the pumping piston during the intake stroke and applied to the LNG in the tank below a predetermined NPSH requirement.

Referring to FIG. 8, another example is shown of a pumping piston of a pumping element configured to follow principles of the present disclosure to reduce the average intake velocity of the pumping piston during an intake stroke relative to the average intake velocity of the pumping piston in FIG. 6, yet achieve a similar pumping output. In FIG. 8, the pumping piston has an average velocity of 4V during the power stroke which has a time value $t_p$ that is equal to one-fourth of the cycle time T (i.e., ¼ T). The pumping piston has an average velocity of −1.33V during the intake stroke which has a time value $t_i$ that is equal to three-fourths of the cycle time T (i.e., ¾ T). The pumping piston undergoes a cycle with an intake stroke having an even lesser average velocity than in the case of FIG. 8, yet still produces an average cycle flow rate or velocity V. It is expected that the exemplary pumping piston cycle of FIG. 8 can be used in cases where the NPSH requirements are even lower than in FIG. 7.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A direct injection gas engine system, comprising:
   an engine including at least one engine cylinder that forms a variable volume between a reciprocating piston, a bore, and a flame deck;

a liquid fuel system including a liquid fuel injector adapted to inject liquid fuel into the variable volume as an ignition source;
a gaseous fuel system including a tank, a pumping element, a drive assembly, and a gaseous fuel injector, wherein:
   the tank has a storage capacity configured to contain a supply of liquefied natural gas (LNG),
   the pumping element is in fluid communication with the tank and the gaseous fuel injector, the pumping element includes a body and a pumping piston disposed therein and defining a pumping chamber therebetween, the pumping piston being reciprocally movable over a range of travel in an intake direction and a power direction in opposing relationship thereto,
   the drive assembly is adapted to reciprocally move the pumping piston in a cycle, the cycle including moving the pumping piston in the intake direction over an intake stroke such that the pumping piston produces a negative pressure that draws an amount of LNG from the tank into the pumping chamber of the body and moving the pumping piston in the power direction over a power stroke such that the pumping piston compresses the amount of LNG in the pumping chamber to form compressed LNG and pumps the compressed LNG out of the pumping chamber toward the gaseous fuel injector, and
   the gaseous fuel injector is configured to inject LNG into the variable volume as a power source;
a controller in electrical communication with the drive assembly, the controller adapted to control the drive assembly such that the pumping piston moves in the intake direction over the intake stroke with an average intake velocity and moves in the power direction over the power stroke with an average power velocity, the average intake velocity being less than the average power velocity;
wherein the drive assembly comprises:
a hydraulic pump in electrical communication with the controller, the hydraulic pump adapted to provide a source of pressurized hydraulic fluid with a variable flow,
a hydraulic actuator in selective fluid communication with the source of pressurized hydraulic fluid, the hydraulic actuator operably arranged with the pumping piston of the pumping element to selectively reciprocally move the pumping piston, and
a directional control valve in electrical communication with the controller, the directional control valve in fluid communication with the source of pressurized hydraulic fluid and in selective fluid communication with the hydraulic actuator, the directional control valve including a valve element movable over a range of travel between an intake flow position, in which pressurized hydraulic fluid flows from the hydraulic pump to the hydraulic actuator such that the hydraulic actuator moves the pumping piston of the pumping element in the intake direction, and a power flow position, in which pressurized hydraulic fluid flows from the hydraulic pump to the hydraulic actuator such that the hydraulic actuator moves the pumping piston of the pumping element in the power direction,
wherein the controller is adapted to selectively move the valve element between the intake flow position and the power flow position;
wherein the controller is adapted to control the hydraulic pump such that pressurized hydraulic fluid flows with an average intake flow rate that is proportional to the average intake velocity of the pumping piston during the intake stroke when the valve element is in the intake flow position and such that pressurized hydraulic fluid flows with an average power flow rate that is proportional to the average power velocity of the pumping piston during the power stroke when the valve element is in the power flow position; and
wherein the hydraulic actuator comprises a cylinder and a hydraulic piston reciprocally movable within the cylinder over a range of travel between a retracted position and an extended position, the hydraulic piston including a piston head and a rod extending from the cylinder, the rod of the hydraulic actuator being operably arranged with the pumping piston of the pumping element such that moving the hydraulic piston of the hydraulic actuator moves the pumping piston of the pumping element.

2. The direct injection gas engine system of claim 1, wherein the controller is adapted to control the drive assembly such that the average intake velocity of the pumping piston produces an average negative pressure that is less than a net positive suction head (NPSH) requirement calculated for a predetermined reserve amount of LNG in the tank.

3. The direct injection gas engine system of claim 2, wherein the predetermined reserve amount of LNG is less than one-fifth of the storage capacity of the tank.

4. The direct injection gas engine system of claim 1, wherein the gaseous fuel system further includes a sensor disposed in the tank, the sensor in electrical communication with the controller, the sensor adapted to detect an amount of LNG in the tank and to provide a level signal indicative of the amount of LNG in the tank to the controller, and wherein the controller is adapted to variably control the drive assembly such that the average intake velocity of the pumping piston produces an average negative pressure that is less than a net positive suction head (NPSH) requirement calculated based upon the amount of LNG in the tank the sensor detected.

5. The direct injection gas engine system of claim 4, wherein the sensor comprises a fluid level sensor.

6. The direct injection gas engine system of claim 1, wherein the hydraulic pump comprises a variable displacement pump.

7. The direct injection gas engine system of claim 1, wherein the body and the piston head of the hydraulic piston define a piston-side chamber and a rod-side chamber each having a variable volume, and wherein the directional control valve meters the source of pressurized hydraulic fluid to the piston-side chamber when the valve element is in the power flow position to move the pumping piston of the pumping element in the power direction and meters the source of pressurized hydraulic fluid to the rod-side chamber when the valve element is in the intake flow position to move the pumping piston of the pumping element in the intake direction.

8. The direct injection gas engine system of claim 1, wherein the liquid fuel system includes a liquid fuel pump configured to draw liquid fuel from a liquid fuel reservoir and provide liquid fuel compressed to a rail pressure to a liquid fuel rail that is fluidly connected to the liquid fuel injector.

9. The direct injection gas engine system of claim 1, wherein the gaseous fuel system further includes a heater interposed between, and in fluid communication with, the pumping element and the gaseous fuel injector, the heater adapted to receive compressed LNG having a temperature from the pumping element and to increase the temperature of the compressed LNG to bring the compressed LNG to a supercritical gaseous state.

10. The direct injection gas engine system of claim 9, wherein the gaseous fuel system further includes a pressure control module interposed between, and in fluid communication with, the heater and the gaseous fuel injector, the pressure control module adapted to control a pressure of compressed LNG from the pumping element.

* * * * *